United States Patent [19]

Knoblock et al.

[11] 4,186,379
[45] Jan. 29, 1980

[54] HIGH-SPEED DATA TRANSFER APPARATUS

[75] Inventors: Daryl E. Knoblock, Dunnyvale; Kenneth O. Carey, San Jose, both of Calif.

[73] Assignee: Hewlett-Packard Company, Palo Alto, Calif.

[21] Appl. No.: 791,804

[22] Filed: Apr. 28, 1977

[51] Int. Cl.² .................. G06F 11/00; H04Q 3/00
[52] U.S. Cl. .................. 340/146.1 R; 340/147 LP
[58] Field of Search .............. 340/146.1 R, 147 R, 340/147 LP; 307/242, 269, 270; 364/900

[56] References Cited

U.S. PATENT DOCUMENTS

| | | | |
|---|---|---|---|
| 3,311,881 | 3/1967 | Mellott | 340/147 LP |
| 3,760,358 | 9/1973 | Isii et al. | 340/147 LP |
| 3,764,981 | 10/1973 | Takasugi | 340/147 LP |
| 3,810,103 | 5/1974 | Ricci | 364/900 |
| 4,011,542 | 3/1977 | Baichtal et al. | 340/147 LP |

*Primary Examiner*—Charles E. Atkinson
*Attorney, Agent, or Firm*—F. D. LaRiviere

[57] ABSTRACT

A high-speed data transfer system comprising a plurality of data drivers, each with controllably reduced on-resistance and correspondingly reduced risk of driver circuit burnout and each operating asynchronously or synchronously with a plurality of different data drivers.

27 Claims, 8 Drawing Figures

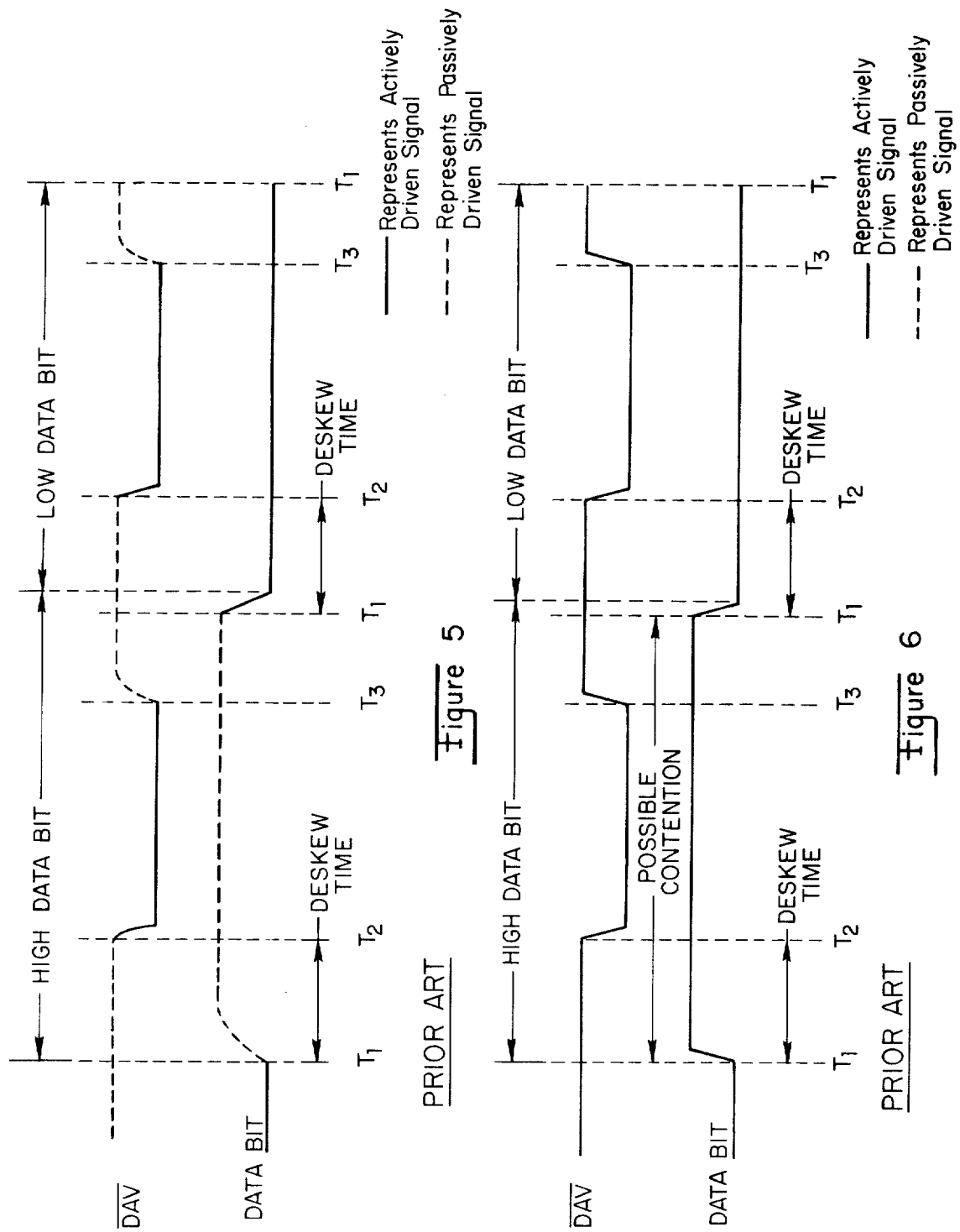

HIGH-SPEED DATA TRANSFER APPARATUS

BACKGROUND OF THE INVENTION

Prior art data transfer systems, such as the one described in U.S. Pat. No. Re. 29,246 are limited to predetermined data transfer rates by high output impedance of the data drivers or have high risk of hardware failure owing to conflicting priorities on common signal bus lines. Conflicting priorities typically arise from the malfunction of selection S/W or H/W. Data transfer rates are typically determined by signal transmission time, response and processing times of data receivers to applied signals, time for each data receiver to indicate to a data sending unit, or driver, that it has received data and that it is ready to receive new data after it processes that data previously received.

Data drivers most commonly used to drive data and valid data indicator (DAV) lines typically contain either passive or active "pullup" circuitry. Referring to FIG. 1, each of a plurality of data drivers include passive pullup circuitry comprising resistor 11 through which current is controlled by a single transistor such as transistor 10 connected to bus line 5. Resistors such as resistor 11 are coupled to each of the lines somewhere in the system to maintain them at a known voltage, $V_{high}$, when no data driver is operating, i.e. transistor 10 cutoff. Thus, the line has been "pulled up" to $V_{high}$ by resistor 11 when transistor 10 in all devices is inactive.

Normally, device selection circuitry will guarantee that only one data driver is active at a time and, in a ll inactive drivers, transistor 10 is then inactive. If, however, a programming or other error or failure in selection causes more than one passive pullup driver to operate at the same time, the current available to driver transistors is still limited by resistor 11 and no burnout occurs. However, the transmission time of a high voltage signal on the bus line is also limited by resistor 11. Signal transmission time is largely determined by the RC time constant introduced by bus line cable capacitance and the value of pullup resistor 11 or saturation resistance, $R_{on}$, of transistor 10. Since the value of resistor 11 is usually much greater than $R_{on}$ of transistor 10, the speed of the low-to-high voltage transition of the bus line when transistor 10 is cutoff is much slower than the high-to-low voltage transition when transistor 10 is turned on. Thus, signal transmission time is retarded, which in turn limits system response time.

Prior art data transfer systems having three-state drivers frequently include "active" pullup circuits such as the one shown in FIG. 2. When pullup transistor 21 within an active data driver is enabled, the bus line is "pulled up" to $V_{high}$, i.e. transistor 21 is saturated. In these systems, the active pullup circuit is enabled at all times when transistor 10 is turned on. The saturation resistance, $R_{on}$, of transistor 21 can be made much lower than the resistance of resistor 11 since, under normal circumstances, it will never supply current to transistor 10. Therefore, much faster signal transmission time is achievable in systems using active pullup than in systems using passive pullups.

However, in the presence of error-caused priority conflicts among two or more drivers, a current path can exist between transistor 10 in one driver and transistor 21 in another. In these cases, the only limitation on the current available to the driver transistors is the series saturation resistance of the transistor. Thus, the probability of hardware failure when such conflicts arise is dramatically increased.

SUMMARY OF THE INVENTION

According to the present invention, data drivers include pullup resistors and modified three-state drivers having enable circuitry which is activated only when a selected driver has priority on the bus line. The enable circuitry is activated by a signal developed from the DAV signal. Although three-state drivers have very low output impedance, $R_{on}$, for producing rapid voltage transitions when active, once those transitions are complete, the output impedance need not remain low. According to the present invention for synchronous and asynchronous data transfer systems, after $V_{high}$ is achieved on a signal line, the output impedance of the data driver is substantially increased to a value still suitable for maintaining that high voltage on the line. Thus, the enable circuitry is deactivated after the rapid voltage transitions are complete.

DESCRIPTION OF THE DRAWING

FIG. 5 is a timing diagram showing the control signals of a prior art passive pullup system of FIG. 1.

FIG. 6 is a timing diagram showing the control signals for a prior art three-state driver of FIG. 2.

DESCRIPTION OF THE PREFERRED EMBODIMENT

A system constructed according to the principles of this invention is configured much like the system described in U.S. Pat. No. Re. 29,246, which is incorporated by reference as if fully set forth herein.

Figure 4:
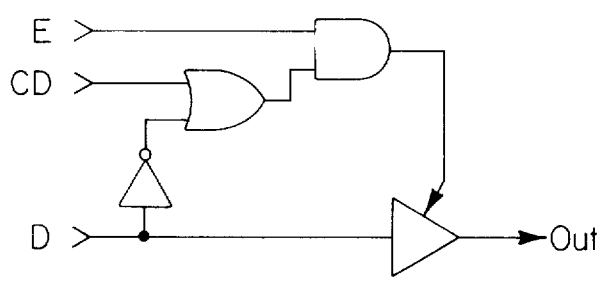
FIG. 4 is a logic diagram of the three-state driver used in the system of FIG. 3.
Figure 3:
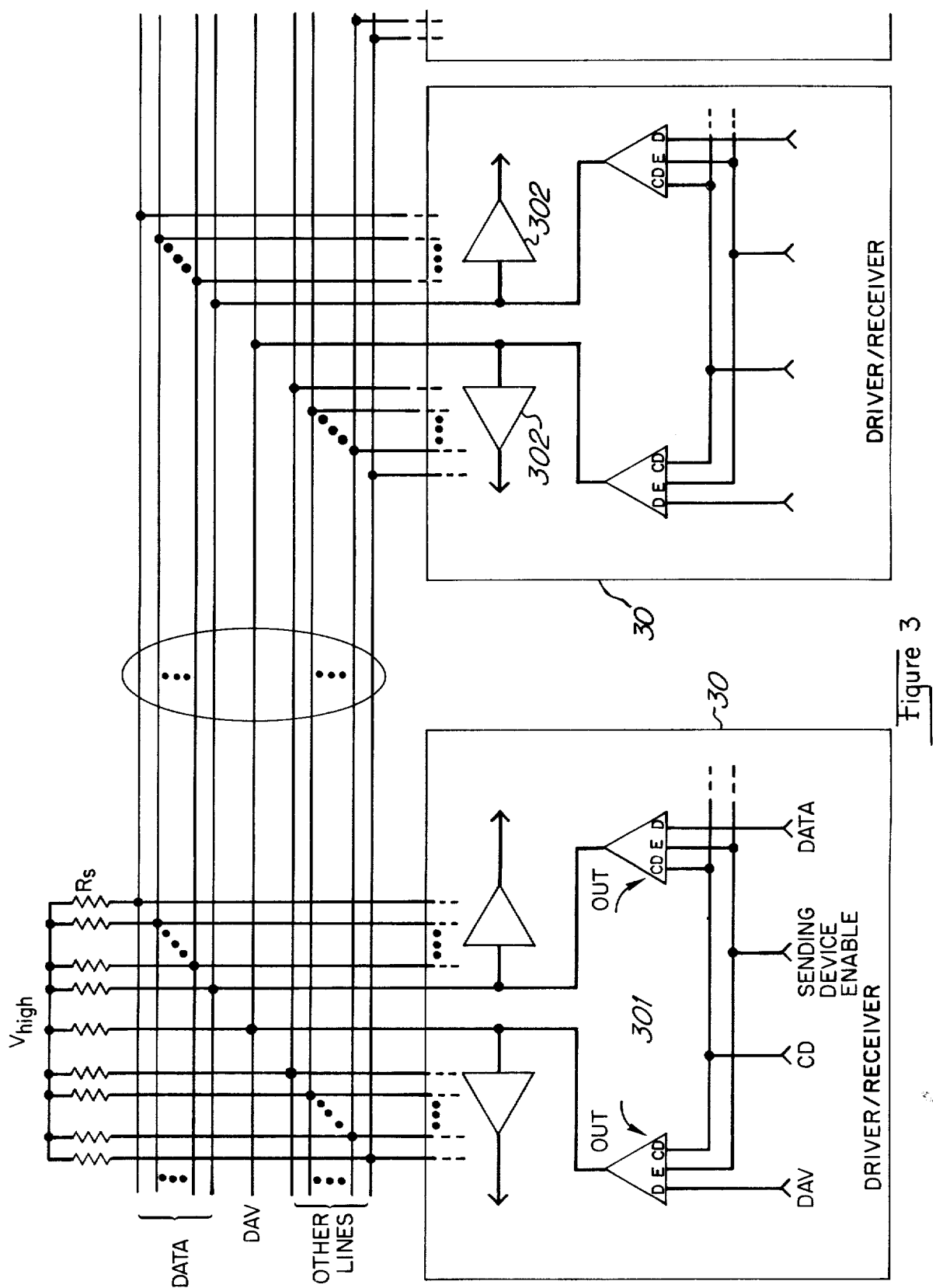
FIG. 3 is a logic diagram of a high-speed data transfer system constructed according to the preferred embodiment of the present invention.

Referring to FIG. 3, typical data receiver/driver 30 comprises three-state data driver 301 and data receivers 302. Each are duplicated for each data link. Each three-state driver comprises the equivalent circuit of FIG. 4 wherein signal D is the data input, signal E is enable input, signal CD is the data changing enable input, which behave according to Table I below:

Table I

| E | D | CD | Out |
|---|---|---|---|
| Low | X | X | High impedance (disabled) |
| High | Low | X | Low impedance pulldown |
| High | High | Low | High impedance (disabled) |
| High | High | High | Low impedance pullup |

X = don't care

Figure 7:
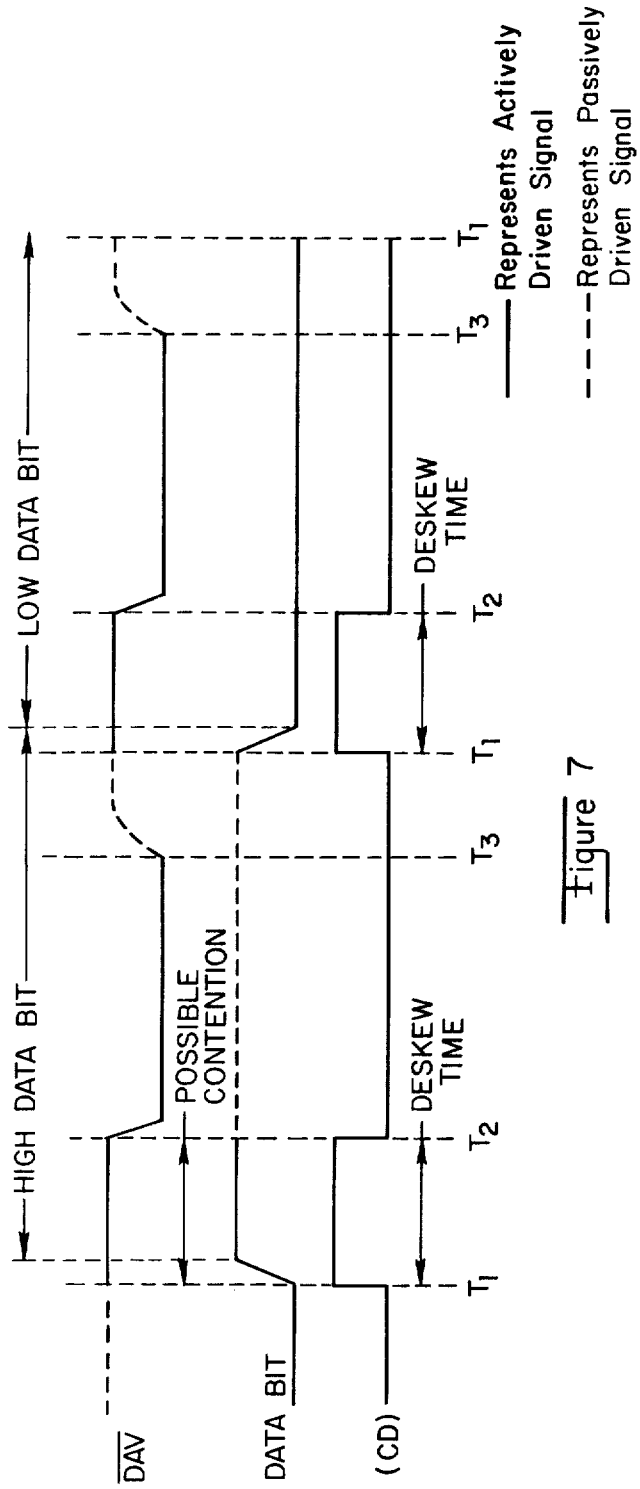
FIG. 7 is a timing diagram showing the control signals for the system of FIG. 3.

The relative timing of these signals is shown in FIG. 7 and is described in more detail later in this specification.

Passive pullup resistors $R_s$, which may be located in each receiver/driver or at any convenient location along the bus line, are sized for maintaining $V_{high}$ on their corresponding bus lines as long as associated-data drivers are not contending for priority on the same bus line, i.e. attempting to drive toward $V_{low}$ or "pulldown". If priority conflict arises, driver impedance is kept low enough to easily assume priority and low voltage on the line results.

Three-state drivers of the preferred embodiment are disabled after $V_{high}$ has been achieved on the bus line. Under normal system operation, pullup resistors ($R_s$) are used to maintain high voltage levels in lieu of the active drivers maintaining the voltage during this period. Such drivers are enabled only when it is known that data is changing or that the drivers are trying to pulldown. Since that mode of operation precludes a steady-state short between two drivers driving toward opposite voltage values on the same bus line, resulting driver burnout is effectively eliminated.

In most data transfer systems, the common practice is to delay the DAV signal for a small period of time after a new byte of data is applied to the data lines to allow for settling of transient conditions such as signal rise and fall times, propagation delays, reflections on the bus lines and the like. During this time period in the present invention, a pulse from the DAV signal delay circuitry is produced for use directly as the "change data" (CD) pulse. The CD pulse enables the active pullup circuitry within the three-state drivers.

Figure 1:
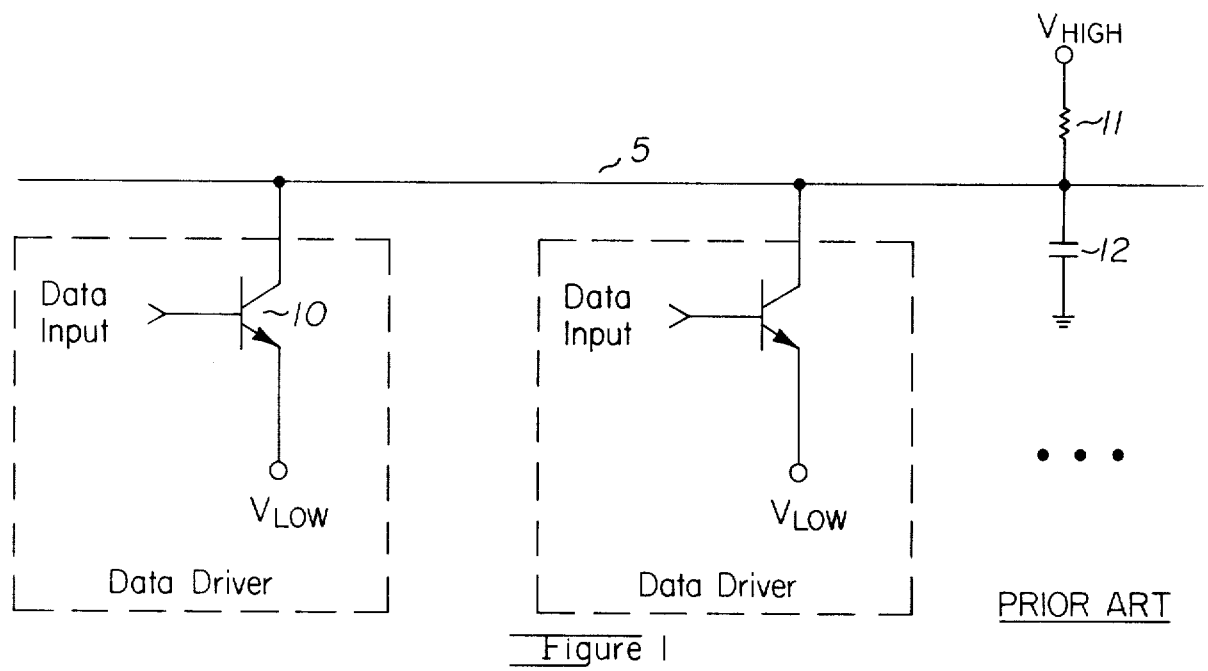
FIG. 1 is a schematic diagram of a passive pullup circuit of a data transfer system in the prior art.
Figure 2:
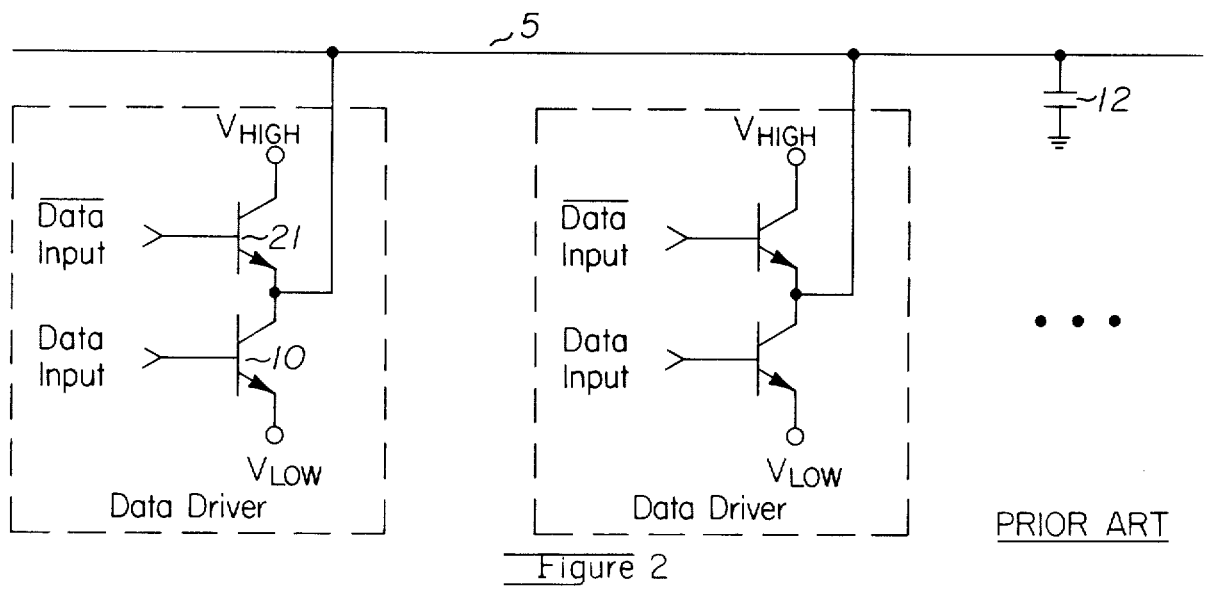
FIG. 2 is a schematic diagram of an active pullup circuit of a data transfer system in the prior art.

In prior art drivers, active pullup circuitry such as transistor 21 in FIG. 2, is enabled at all times throughout the cycle. Thus, conflict for bus line priority having the substantial probability of causing hardware failure can occur at any time during the cycle. Referring now to FIGS. 5 and 6, DAV signal is applied at $T_2$ which is $T_2-T_1$ (deskew time) after data is placed on the bus line. Deskew time, which is arbitrarily selected, is the settling time required by the system bus line. At time $T_3$, the receivers have received the data, acknowledge their acceptance of data, (e.g. DAC signal is transmitted by the receivers), and the DAV signal is removed. Time duration $T_3-T_2$ is the time during which valid data may be received by the receivers.

Referring to FIG. 7 for the present invention, data is applied to the bus lines by the data drivers and active pullup or pulldown is enabled at time $T_1$. At time $T_2$ active pullup transistor 21 is disabled if originally enabled, and the DAV signal is applied to the bus line. At time $T_3$, the DAV signal is terminated and data allowed to change when it is confirmed that the receivers have received the valid data, i.e. DAC signal transmitted by receiver. Thus, the drivers attempt to transmit valid data during the time $T_3-T_1$. When the active pullup circuit is disabled at time $T_2$, logic voltage levels on the bus line are maintained by pullup resistors $R_s$ until time $T_3$. Conflict for bus line priority between two or more drivers having the potential for causing hardware failure can only occur during the deskew time $T_2-T_1$, the duration of the CD pulse.

If priority conflict exists in a data transfer system utilizing this invention, the two or more conflicting drivers typically will be synchronized. In this case, actual shorting of a data driver being driven to $V_{high}$ to a data driver being driven to $V_{low}$ can occur only during the CD pulse, the widths of which being limited to a specific arbitrary data settling time. The power dissipated during the actual short can be averaged over the entire cycle when analyzing the potential for driver burnout. Thus, the driver output impedance can be reduced at reduced risk of driver burnout.

Figure 8:
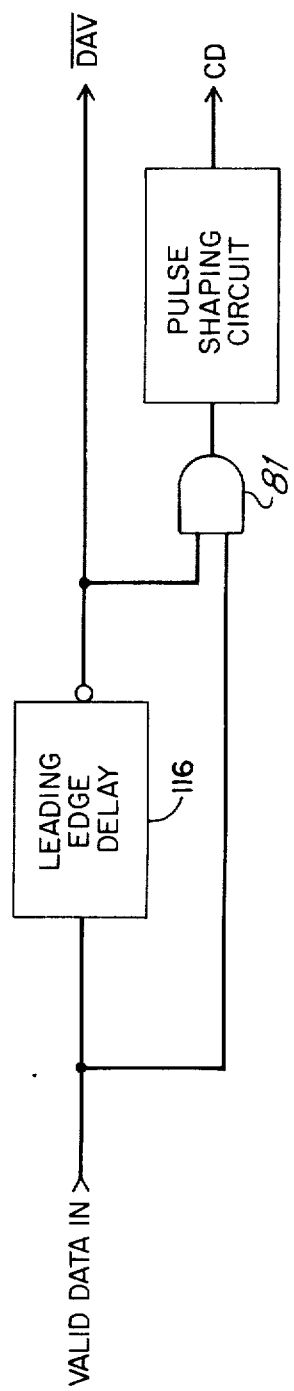
FIG. 8 is a logic diagram of a CD pulse generating system for use with the data transfer system of FIG. 3.

It should be noted that the CD pulse used by the driver is easily obtainable in an asynchronous system which places data on the bus a finite delay time before asserting the DAV signal. A single AND gate, such as 81, or equivalent logic, may be connected to an already existing delaying element used to hold off the assertion of the DAV signal as shown in FIG. 8. The duration of the resulting CD pulse is approximately equal to the delay.

We claim:

1. High-speed data transfer apparatus comprising:
   two or more data driver means for driving data signals having high and low logic voltages to be transferred, each of said data driver means being selectively enabled for driving high and low logic voltages;
   one or more data receiver means for operating on the data signals in response to a logic signal representing the validity of the data signals being driven by data driver means;
   data bus means for coupling data signals commonly from an enabled data driver means to one or more of the data receiver means;
   one or more logic driver means for driving the logic signals, said logic signals having high and low logic voltages;
   one or more logic receiver means for operating on the logic signals in response thereto;
   logic bus means for coupling the logic signals commonly from a logic driver means to one or more logic receiver means;
   control means coupled to each of the data driver and logic driver means for producing a control signal in response to the data signals and for terminating the control signal in response to the logic signal; and
   each of the enabled data driver means being controlled by its control signal for driving only high or low logic voltage, all of said controlled data driver means being controlled to drive the same logic voltage.

2. High-speed data transfer apparatus as in claim 1 wherein the data driver means includes passive and active pullup circuitry and active pulldown circuitry.

3. High-speed data transfer apparatus as in claim 2 wherein:
   said passive pullup circuitry is a resistor coupled to high logic voltage;
   said active pullup circuitry includes a transitor coupled to high logic voltage; and
   said active pulldown circuitry includes a transistor coupled to low logic voltage.

4. High-speed data transfer apparatus as in claim 2 wherein said active pullup circuitry is activated in response to the control signal.

5. High-speed data transfer apparatus as in claim 2 wherein said active pullup circuitry is deactivated upon termination of the control signal and said passive pullup circuitry remains operable.

6. High-speed data transfer apparatus as in claim 4 wherein said active pullup circuitry is deactivated upon termination of the control signal and said passive pullup circuitry remains operable.

7. High-speed data transfer apparatus as in claim 1 wherein said data driver means includes a three-state driver.

8. High-speed data transfer apparatus as in claim 1 wherein contention for priority for driving data signals between any two simultaneously enabled data driver means is limited by the control signal to approximately the time from the beginning of data signals to the beginning of the logic signal representing the validity of the data signals.

9. High-speed data transfer apparatus as in claim 1 wherein contention for priority for driving data signals between any two simultaneously enabled data driver means is limited to approximately the duration of the control signal.

10. High-speed data transfer apparatus as in claim 2 wherein contention for priority for driving data signals between the active pullup circuitry of one enabled data driver means and the active pulldown circuitry of another enabled data driver means is limited by the control signal to approximately the time from the beginning of data signals and to the beginning of the logic signal representing the validity of the data signals.

11. High-speed data transfer apparatus as in claim 2 wherein contention of priority for driving data signals between the active pullup circuitry of one enabled data driver means and the active pulldown circuitry of another enabled data driver means is limited to approximately the duration of the control signal.

12. High-speed data transfer apparatus as in claim 8 wherein one of said simultaneously enabled data driver means is driving a high logic voltage and the other of said simultaneously enabled data driver means is driving a low logic voltage.

13. High-speed data transfer apparatus as in claim 9 wherein one of said simultaneously enabled data driver means is driving a high logic voltage and the other of said simultaneously enabled data driver means is driving a low logic voltage.

14. High-speed data transfer apparatus as in claim 1 wherein:
   two or more logic driver means are selectively enabled; and
   each of the enabled logic driver means are controlled by its control signal for driving only high or low voltage, all of said controlled logic driver means being controlled to drive the same logic voltage.

15. High-speed data transfer apparatus as in claim 14 wherein said logic driver means includes passive and active pullup circuitry and active pulldown circuitry.

16. High-speed data transfer apparatus as in claim 15 wherein:
   said passive pullup circuitry is a resistor coupled to high logic voltage;
   said active pullup circuitry includes a transistor coupled to high logic voltage; and
   said active pulldown circuitry includes a transistor coupled to low logic voltage.

17. High-speed data transfer apparatus as in claim 15 wherein said active pullup circuitry is activated in response to the control signal.

18. High-speed data transfer apparatus as in claim 17 wherein said active pullup circuitry is deactivated upon termination of the control signal and said passive pullup circuitry remains operable.

19. High-speed data transfer apparatus as in claim 15 wherein said passive pullup circuitry determines the logic voltage upon termination of the control signal while the active pulldown circuitry is deactivated.

20. High-speed data transfer apparatus as in claim 15 wherein said active pullup circuitry is deactivated upon termination of the control signal and said passive pullup circuitry remains operable.

21. High-speed data transfer apparatus as in claim 14 wherein said logic driver means includes a three-state driver.

22. High-speed data transfer apparatus as in claim 14 wherein contention for priority for driving logic signals between any two logic driver means is limited by the control signals to approximately the time from the beginning of transmission of data signals to the logic signal representing the validity of the data signals.

23. High-speed data transfer apparatus as in claim 14 wherein contention for priority for driving logic signals between any two simultaneously enabled logic driver means is limited to approximately the duration of the control signal.

24. High-speed data transfer apparatus as in claim 15 wherein contention for priority for driving data signals between the active pullup circuitry of one driver means and the active pulldown circuitry of another driver means is substantially limited to the time from the beginning of transmission of data signals and to the beginning of the indication of the validity of the data signals.

25. High-speed data transfer apparatus as in claim 15 wherein contention for priority for driving data signals between the active pullup circuitry of one driver means and the active pulldown circuitry of another driver means is substantially limited to the duration of the control signal.

26. High-speed data transfer apparatus as in claim 2 wherein said passive pullup circuitry determines the logic voltage upon termination of the control signal while the active pulldown circuitry is deactivated.

27. Process for high-speed transfer of data signals having high and low logic voltages from two or more selectively enabled data driver means to one or more data receiver means, each of said data driver means being controlled for driving only high or low logic voltage and all of said controlled data driver means being controlled to drive the same logic voltage, and employing one or more logic driver means for driving logic signals having high and low logic voltages representing the validity of the data signals and one or more logic receiver means for operating on the logic signals, the process comprising the steps of:
   driving the data signal in common to all of the data receiver means from the data driver means;
   producing a control signal in response to the data signals;
   applying the control signal to the enabled data driver means for controlling said driver means to only high or low logic voltage, all of said controllable data driver means being controlled to drive the same logic voltage;
   driving the logic signal in common to all of the logic receiver means from the logic driver means; and
   terminating the control signal in response to the logic signal.

* * * * *